United States Patent Office 3,674,321
Patented July 4, 1972

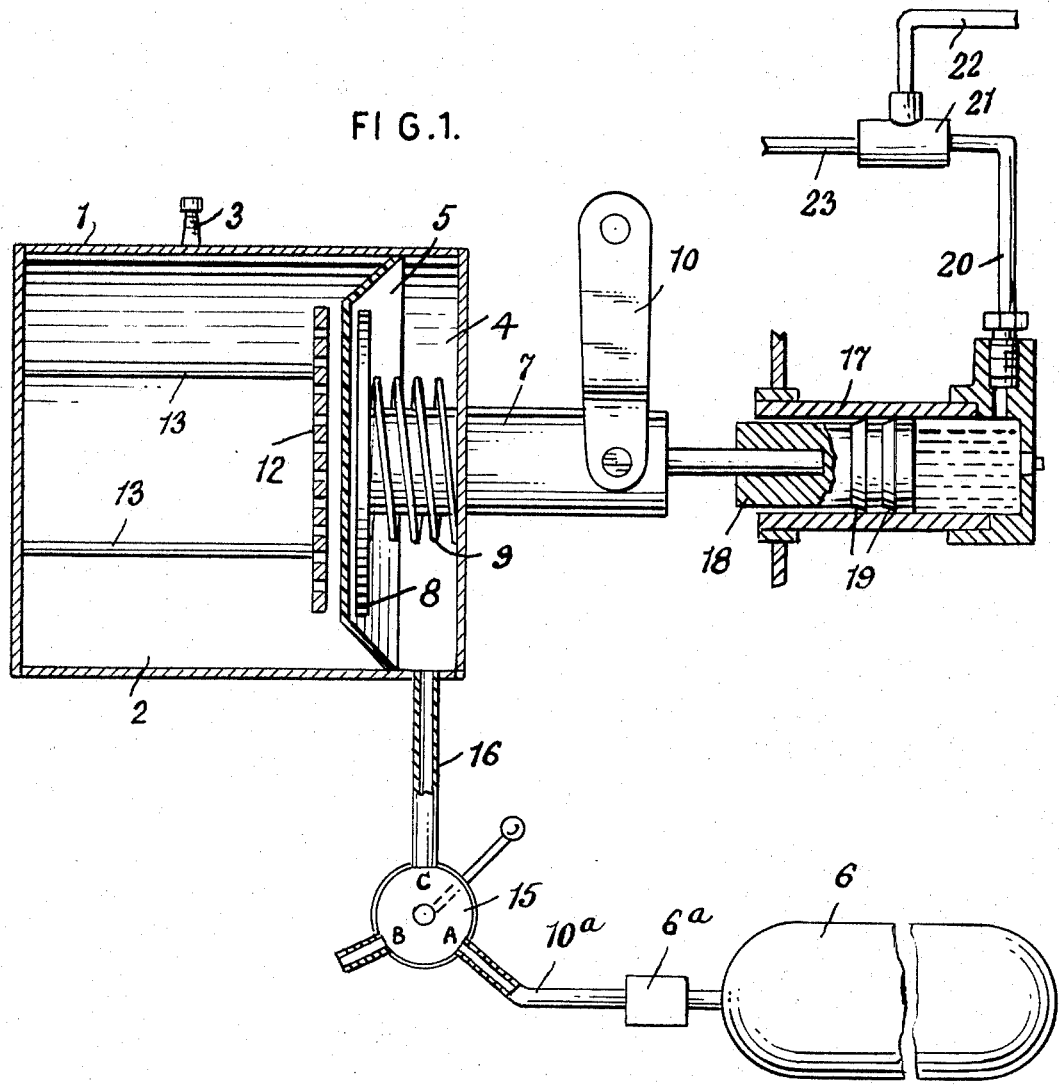

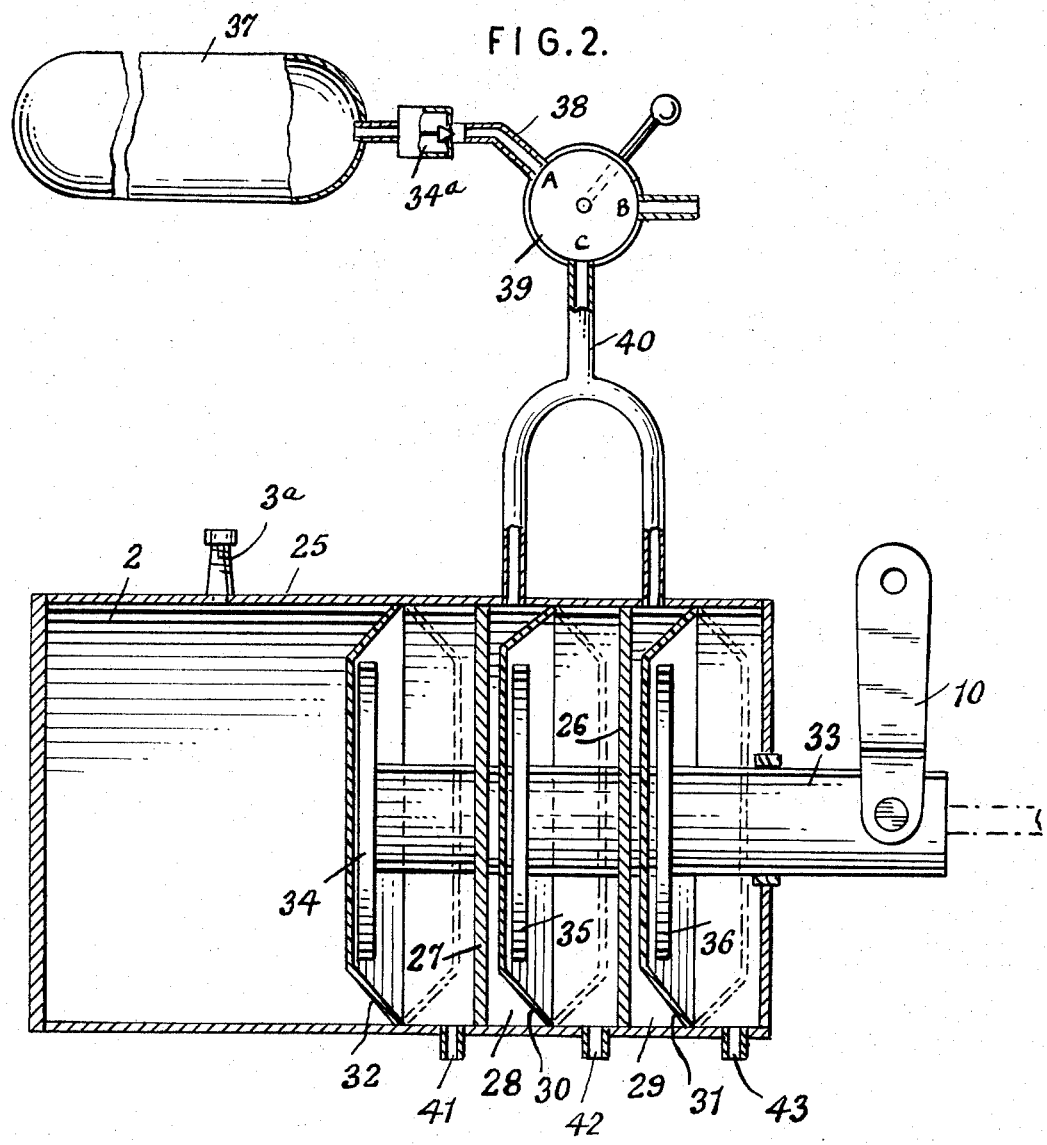

3,674,321
CAPTIVE AIR BRAKE FOR VEHICLES
John Garfield Fontaine, 2817 NE. 26th Court,
Fort Lauderdale, Fla. 33306
Filed June 29, 1970, Ser. No. 50,538
Int. Cl. B60t 13/28, 15/20
U.S. Cl. 303—28                6 Claims

ABSTRACT OF THE DISCLOSURE

A brake system consisting of an embodiment in which a brake-applying mechanism is normally maintained in a position of brake application by means of captive air pressure and in which brake release is attained by counter air pressure of greater force than the captive air pressure. Another embodiment involves the use of vacuum from the intake manifold of a vehicle motor or by the use of a vacuum tank and a one-way check valve, the vacuum creating a force greater than the force of the captive air, to thereby cause brake release.

BACKGROUND OF THE INVENTION

This invention relates to a secondary or back-up system for automotive vehicles, such as trucks, transit and school buses, farm tractors, road working equipment, motor cars, and other types of vehicles.

The majority of braking systems on motor vehicles are known as hydraulic brakes, and many hydraulic brake systems are powered by vacuum assist equipment, commonly known as "Hydrovac." Many vehicles of the heavier type are equipped with air brakes, and there are vehicles being produced, especially farm tractors, that are equipped with mechanical brakes.

There have been occasions when a vehicle equipped with hydraulic brakes having vacuum power assist, when in motion has lost vacuum by the motor stalling or otherwise. In some instances the driver did not have the strength to exert the required pressure on the foot pedal to halt the vehicle so that an accident resulted.

There have also been occasions when a vehicle equipped with air brakes has lost air because of a broken or loose pipe, or for other reasons, and the driver because powerless to halt the vehicle in time to avoid an accident. Therefore, one of the objects of the present invention is to provide an automatic emergency brake in the event that vacuum or compressed air becomes lost while the vehicle is in motion.

Another object of the invention is to improve the system commonly referred to as spring brakes by:

(a) Having the ability to exert the exact amount of pressure on the brakes of any vehicle, regardless of its weight, size or the speed at which it is traveling, to bring the vehicle to a safe, controlled stop.

(b) Having the ability, in the event of mechanical failure of the vehicle, to quickly and simply disengage the brakes by removing the compressed air from a captive-air chamber, not unlike letting the air out of a tire, thereby permitting the vehicle to be moved off the road or towed away.

Still another object of the invention is to provide an improved fail safe parking brake applicable to any vehicle.

Briefly, the captive air brake system operates in the following manner:

Compressed air is pumped into a captive air chamber at a service station to a specified pressure, somewhat similar to inflating a tire. The captive air pressure thus provided exerts a pressure on the brakes at all times if such pressure is unopposed. It would be unopposed in the vacuum model shown in FIG. 2 of the accompanying drawings if the vacuum was cut off at 38a and atmosphere entered the line 40 from port B and it would be unopposed in the compressed air model shown in FIG. 1 if compressed air was cut off at A and compressed air was permitted to exhaust from line 16 through port B. In each of these cases the brakes would be applied.

The hand valve shown in the drawings is placed in near proximity to the driver. The captive air brakes would be opposed in the vacuum model shown in FIG. 2 if the hand valve 39 was in "off" position, closing port B to atmosphere an dopening port A to port C; 28 and 29 would be evacuated by tank 37 to port 40 and atmospheric pressure would enter ports 42 and 43 opposing captive air in chamber 2, and the captive air brakes would be opposed in the air brake model shown in FIG. 1 if hand valve 75 was manipulated in "off" position, closing port B and permitting compressed air to enter valve 15 through port A, and from thereto to port C through line 16 and compressed air chamber 8. In each of these cases the brakes would be held "off."

In the accompanying drawings, wherein illustrative embodiments of the invention are disclosed, FIG. 1 is a diagrammatic view of a braking system constructed in accordance with the invention, and FIG. 2 shows another embodiment of the invention.

DESCRIPTION OF THE INVENTION

Referring to the drawings, and more particularly to FIG. 1, there is shown therein at 1 a container or tank of cylindrical form, provided with an internal chamber 2 containing captive air under pressure and to a degree required for suitable brake application depending upon the weight of the vehicle and other factors.

Said chamber 2 contains the captive air and can be filled with the compressed air to the required degree through a conventional air valve shown at 3. Fitted within the container and dividing it into compartments or chambers 2 and 4 is a dished or cupped flexible diaphragm 5 which may be composed of rubber, plastic or other suitable material. The diaphragm is secured at its peripheral edge to the circumferential wall of the container 1. The position of the diaphragm shown in FIG. 1 is that which it assumes when it is normally under counter air pressure from air obtained from an air supply tank shown at 6. When under the influence of captive air from chamber 2, the diaphragm can assume the position shown in dotted lines in respect to the diaphragms shown in that figure of the drawings. A check valve 6a is interposed in the line 10a leading from the tank 6 to a valve 15.

Axially movable through an end wall of the container 1 is a piston 7 provided at one end with a circular head or disk 8. A compression spring 9 surrounds the rod 7 and exerts sufficient force upon the disk 8 to maintain it in constant contact with the diaphragm 5. A lever 10 is pivotally coupled to the piston rod 7, said lever extending to the brake-application mechanism of known character.

The piston rod 7 carries a piston 18 operative in the cylinder 17 containing hydraulic brake fluid. The piston is provided with sealing rings 19. The conduit 20, leading from the cylinder 17 leads to a shuttle valve 21. The piping 23 leads to the master cylinder of the brake system, and the piping 22 extends to the brake wheel cylinders.

A perforated or foraminous disk or stop plate 12, supported by a plurality of rods 13 is maintained in the chamber 2 to limit the flexure or movement of the diaphragm under the air pressure obtained from the supply tank, which air exhibits a force counter to the strength of the captive air contained in the chamber 2 of the container 1 and which is of sufficient force to overcome the captive air.

The operation of the arrangement shown in FIG. 1 is substantially as follows:

The container 1 contains the captive air under pressure to the required extent according to the amount of braking force needed. At 15 is shown a three-way valve that may be hand operated and it is interposed between the supply tank 6 and the air chamber 4. When the valve 15 is in its "off" position it will be arranged so that air will flow from tank 6 through outlet C and through the conduit 16 that establishes communication between the chamber 4 and the supply tank 6. Such air pressure, entering the chamber 4 will force the diaphragm 5 to the left or to the position shown in FIG. 1 and will exert a force counter to the air pressure in the chamber 2. This is the position of the parts while the brakes are in a released condition.

Under the bias of the spring 9 the piston rod 7 will follow the diaphragm, the halting of which will be effected by means of the stop plate 12. The holes in said plate permit the passage of the air through it. The brakes will thus remain off as long as the air pressure in the chamber 4 is sufficient to overcome the captive air pressure in the chamber 2. When the brakes are to be applied, the valve 15 is moved to an "on" position and in such position the outlet A of the valve 15 will be closed off and no air from the supply tank 6 can flow to reach the chamber 4. At this time, the outlet C of the valve 15 will be open and allow air exhaust through the outlet B and the air pressure from the chamber 4 will flow out of the outlet B so that the captive pressure in the tank chamber 2 will become effective to force the diaphragm 5 to the right and move the piston rod 7 in the same direction and thereby apply the brakes. The brakes will thereafter be maintained in such applied condition until air from the tank 6 is again directed into the chamber 4 to overcome the pressure in the chamber 2.

In the embodiment shown in FIG. 2 there is disclosed a container or cylinder 25 provided with a compressed air chamber 2 in which the captive air under pressure is contained, and an air valve 3a permits filling of the chamber 2 with captive air having the pressure needed to apply the required braking force.

The interior of the chamber 25 contains partitions 26 and 27 dividing the cylinder into compartments or chambers indicated at 28 and 29. Chamber 28 contains a diaphragm 30 similar in construction to the diaphragm 5 in FIG. 1; chamber 29 contains a diaphragm 31, and a diaphragm 32 is contained in the captive air chamber 2. These diaphragms are all peripherally attached to the wall of the cylinder 25. A piston rod 33 carries three disks or heads indicated at 34, 35 and 36, each of these disks being arranged for co-operation with one of the diaphragms. In the drawings, the disks shown at 8, 34, 35 and 36 are shown, for clarity in illustrations, slightly spaced from the adjacent diaphragms, but in actual practice these disks are really in contact with the diaphragms.

At 37 is shown a vacuum tank or the intake manifold of the vehicle and a check valve 34a is provided in the piping 38 leading from the tank or manifold 37 to a three-way hand-operated valve 39.

The operation of the embodiment shown in FIG. 2 is substantially as follows:

When the valve 39 is in its "off" position, the vacuum or suction will be present in the chambers 28 and 29 through the line 40 and through port C to port A and past the check valve 34a and in the tank or manifold 37. The valve 39, at this time will close off the port B. The parts in the position mentioned are effective to hold the brakes in an off position.

When the valve 39 is moved to an "on" position or one in which the port A is closed, port B communicating with atmosphere, will be open to port C, thereby permitting atmosphere to enter line 40 and chambers 28 and 29 removing the opposing force to the captive air, thereby permitting the brakes to be applied. The brakes will remain in the applied condition as long as no vacuum is present. Since the vacuum is developed by motor operation, it follows that the brakes will remain on while the vehicle is parked or at any time that the motor is not running. When the motor is started and the chambers 28 and 29 are again under vacuum by the movement of the valve 38 to "off" position, the brakes will be released. The outlets shown at 41, 42 and 43 are breather openings and allow atmosphere to enter and exhaust.

It is to be noted that while the valves shown at 15 and 39 are, as herein stated, hand-operated it will be apparent that they can be solenoid or electrically or automatically controlled according to necessity.

The embodiments shown in the drawings are illustrated diagrammatically and it will be understood that in actual practice refinements can be added. For example, the elements through which the piston rods are movable will be suitably bushed or provided with sealing rings around the piston rods to avoid the possibility of air leakage at these and other points in the structure, and it will be understood that piston rod 33 in FIG. 2 can be fitted with hydraulic cups and cylinder as shown in FIG. 1.

What I claim is:

1. A brake arrangement comprising, an air cylinder having a chamber containing captive air under pressure normally sufficient to maintain the brakes of a vehicle in applied condition, a diaphragm extending across the interior of the cylinder to divide the same into the captive air chamber and to provide a second air chamber, the captive air under pressure exerting a force on one face of the diaphragm, a piston slidable axially through the cylinder, said piston having a head, spring means for maintaining the head in contact with the diaphragm whereby flexing movement of the diaphragm will move the piston, air supply means for furnishing air under greater pressure than the pressure of the captive air to thereby flex the diaphragm in a direction opposite to its flexure under the influence of the captive air, valve means interposed between the air supply means and the second chamber, said valve means being operative when in one position to cause air flow from the air supply means to the second air chamber, the valve being operative when in another position to prevent air flow to the second chamber and permitting air exhaust from said second chamber to enable the diaphragm to be moved by the captive air to thereby cause brake application.

2. A brake arrangement according to claim 1, including a check valve interposed in the air line that extends between the valve and the second chamber, said check valve being located between the air supply means and said second chamber.

3. A brake arrangement according to claim 1, wherein the valve is a three-way valve that permits the supply of air under pressure from the air supply means to the second chamber, said valve being operable to shut off said air supply when desired while permitting the exhaust of air from the second chamber.

4. A brake arrangement according to claim 1, including a hydraulic fluid cylinder containing a piston, said hydraulic cylinder being connected to a shuttle valve that is connected to piping leading to a master cylinder of a braking system and to brake wheel cylinders, the piston in the hydraulic cylinder being connected to the piston located in the second chamber.

5. A brake arrangement according to claim 1, including a stop plate located within the chamber in which the captive air is contained, said plate being disposed in the path of flexure of the diaphragm to thereby limit the extent of flexure of the diaphragm under the air pressure obtained from the air supply means.

6. A brake arrangement according to claim 5, wherein the stop plate is in the form of a disk and is substantially foraminous.

References Cited
UNITED STATES PATENTS

| | | | |
|---|---|---|---|
| 3,090,359 | 5/1963 | Hoppenstand | 188—170 X |
| 3,385,636 | 5/1968 | Cruse | 303—2 |
| 3,582,150 | 6/1971 | Williams et al. | 303—9 |

MILTON BUCHLER, Primary Examiner

S. G. KUNIN, Assistant Examiner

U.S. Cl. X.R.

91—414; 188—106 P; 303—2, 9, 13